United States Patent [19]
Kafka et al.

[11] Patent Number: 5,812,308
[45] Date of Patent: Sep. 22, 1998

[54] MODE LOCKED LASER AND AMPLIFIER

[75] Inventors: James D. Kafka, Mountain View; Jan-Willem Pieterse, San Jose, both of Calif.

[73] Assignee: Spectra Physics Lasers, Inc., Mountain View, Calif.

[21] Appl. No.: 575,368

[22] Filed: Dec. 20, 1995

[51] Int. Cl.[6] .............................. H01S 3/00; H01S 3/081
[52] U.S. Cl. ...................... 359/346; 359/347; 359/340; 372/93
[58] Field of Search ................. 372/92, 93, 18; 359/347, 348, 340, 346

[56] References Cited

U.S. PATENT DOCUMENTS

| | | | |
|---|---|---|---|
| 3,586,997 | 6/1971 | Kinsel | 331/94.5 |
| 3,810,042 | 5/1974 | Chang et al. | 331/94.5 |
| 3,824,488 | 7/1974 | Aleksoff | 331/94.5 K |
| 4,703,491 | 10/1987 | Lim | 372/93 |
| 4,780,877 | 10/1988 | Snitzer | 372/6 |
| 4,782,491 | 11/1988 | Snitzer | 372/6 |
| 4,815,079 | 3/1989 | Snitzer et al. | 372/6 |
| 5,034,613 | 7/1991 | Denk et al. | 250/458.1 |
| 5,271,031 | 12/1993 | Baer | 372/93 |
| 5,297,156 | 3/1994 | Deacon | 372/21 |
| 5,315,612 | 5/1994 | Alcock et al. | 372/69 |
| 5,412,683 | 5/1995 | Nighan, Jr. et al. | 372/75 |

OTHER PUBLICATIONS

Baer, et al., "Performance of Diode–Pumped Nd:YAG and Nd:YLF Lasers in a Tightly Folded Resonator Configuration", IEEE Journal of Quantum Electronics, vol. 28, No. 4 (Apr. 1992).

Braun, et al., "Spatial–hole–burning–enhanced reduction of pulsewidth in mode–locked end–pumped solid–state lasers", CLEO'94 (1994).

Weingarten, et al., "Passively mode–locked diode–pumped solid–state lasers use an antiresonant Fabry–Perot saturable absorber", Optics Lasers, vol. 18, No. 8 (Apr. 15, 1993).

*Primary Examiner*—Mark Hellner
*Attorney, Agent, or Firm*—Wilson Sonsini Goodrich & Rosati

[57] ABSTRACT

A laser system has a high reflector and an output coupler defining a laser cavity with an optical axis. Included is a pump source, a mode-locking apparatus and at least one fold mirror positioned in the laser cavity along the optical axis. A gain media is positioned adjacent to the fold mirror. The gain media has an overlap region where an intracavity beam entering the gain media substantially overlaps the intracavity beam exiting the gain media.

33 Claims, 3 Drawing Sheets

MODE LOCKED LASER AND AMPLIFIER

BACKGROUND OF THE INVENTION

1. Field of the Invention

This invention relates to mode-locked lasers and to oscillator-amplifier systems which include a mode-locked oscillator, and more particularly to a mode-locked laser or oscillator-amplifier system with a multiple quantum well apparatus and a gain media positioned in the laser cavity adjacent to a fold mirror.

2. Description of Related Art

Picosecond and femtosecond optical pulses have applications in a variety of different technologies. Modelocking is generally employed to obtain short pulses from a laser.

Weingarten et al. have reported passively mode-locked diode-pumped Nd:YAG and Nd:YLF lasers with antiresonant Fabry-Perot saturable absorbers, Weingarten et al., *Optics Letters,* Vol 18, No. 8, pp 640–642, April 1993. Weingarten et al. used a diode pumped mode-locked laser with a saturable absorber positioned at one end of the laser cavity, and the gain media at the other end. The output coupler was positioned in the middle and two output beams were produced. Because two output beams were produced, the output power in a single beam was less than desired Braun et al. have reported two mode-locked lasers, one with the gain media in at the end of the laser cavity, and the other with the gain media located in the middle of the laser cavity. B. Braun, K. Weingarten, U. Keller, in *Conference on Lasers and Electro-Optics,* Vol 8, 1994, OSA Technical Digest Series (Optical Society of America, Washington D.C. 1994), paper, CThI1 p. 317. When the gain media was at the end of the cavity spatial hole burning caused the spectrum of the output pulses to broaden and shorter pulses were produced. The same result was not achieved when the gain media was positioned in the middle of the cavity.

Plaessmann et al. have disclosed a multipass diode-pumped solid-state optical amplifier, Plaessmann et al., *Optics Letters,* Vol 18, No. 17, pp 1420–1422, September 1993. The optical amplifier of Plaessmann et al. used only "pumped region" with many passes but refocused after every pass. Only one pass per Rayleigh Range was achieved. The device of Plaessmann et al. did not provide a simple optical amplifier that produced high gain at higher powers.

Baer et al. have disclosed a tightly folded amplifier to provide high gain. the amplifier consisted of multiple pumped regions. The input beam made only two passes in each pumped region. IEEE Journal of Quantum Electronics, Vol 28, No. 4, April 1992, pp 1131–1138.

It would be desirable to provide, (i) a laser cavity that maintains the broad spectrum and short pulses that are obtained by spatial hole burning, (ii) a laser cavity with a mode-locking device positioned in the cavity adjacent to one of the end mirrors, a gain media positioned adjacent to a fold mirror, and an output coupler as the second end mirror so that a single output beam is produced, and (ii) a simplified oscillator-amplifier system with short pulses, high power.

SUMMARY OF THE INVENTION

Accordingly, it is an object of the invention is to provide a mode-locked laser system that produces short pulses with high output power.

Another object of the invention is to provide a mode-locked laser that produces a single output beam.

A further object of the invention is to provide a mode-locked laser where there is substantial overlap between the pumped region of the gain media with the intracavity beams entering and exiting the gain media.

Still a further object of the invention is to provide an oscillator-amplifier system which produces short pulses and high power.

A further object of the invention is to provide an amplifier where the input beam makes more than two passes in a single pumped region of the amplifier and within one Raleigh range.

These and other objects of the invention are achieved in a laser system with a high reflector and an output coupler defining a laser cavity with an optical axis. Included is a pump source, a mode-locking apparatus and at least one fold mirror that is positioned in the laser cavity along the optical axis. A gain media is positioned adjacent to the fold mirror. The gain media has a pumped region. The gain medium also has an overlap region where intracavity beams entering and exiting the gain media substantially overlap the pumped region.

The present invention also provides a solid state amplifier with a gain media and a pump source. At least one mirror is positioned near the gain media. An input beam makes more than two passes in a single pumped region of the amplifier and within one Rayleigh range.

In the oscillator the overlap between the entering and exiting intracavity beams and the pumped region in the gain media is at least 25%, and more preferably 50% or greater. A plurality of fold mirrors can be included in the laser cavity. More than one gain media can be positioned adjacent to any one of the fold mirrors. Preferably, the gain media is positioned 5 mm or less from its associated fold mirror.

The laser cavity typically is generally a linear cavity and produces a single output beam. However, a ring cavity can also be employed.

The laser system is preferably a solid state laser. In one embodiment, the pump source is a diode source, including but not limited to a single emitter, a broad stripe emitter or preferably a fiber coupled diode bar.

A mode-locking device is positioned adjacent to either the high reflector or the output coupler defining the laser cavity. Suitable mode-locking devices include but are not limited to multiple quantum well devices. In one embodiment, the mode-locking device functions as a saturable absorber.

A variety of different gain media materials can be used, including but not limited to Nd:YAG, Nd:YLF, Nd:YVO$_4$ and Nd:glass.

DETAILED DESCRIPTION

Figure 1:
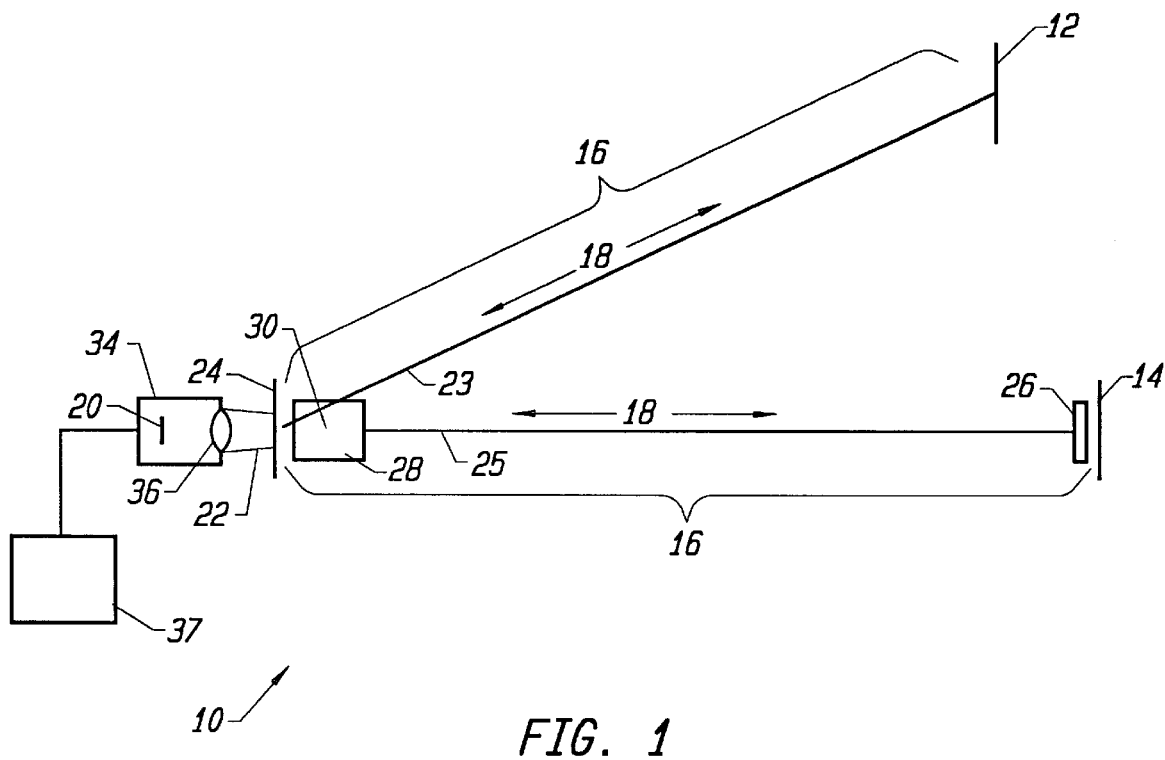
FIG. 1 is a schematic diagram of a laser system of the present invention with one fold mirror.

Referring to FIG. 1, a laser system 10 with an output coupler 12 and a high reflector 14 defines a laser cavity 16 with an optical axis 18. A pump source 20 produces a pump beam 22 that is directed along optical axis 18. At least one fold mirror 24 is positioned in laser cavity 16 along optical axis 18. A mode-locking apparatus 26 is in laser cavity 16 adjacent to or in intimate contact with high reflector 14 or output coupler 12. A gain media 28 is positioned adjacent to fold mirror 24. Within gain media 28 is an overlap region 30 where the intracavity beams 23 and 25 entering and exiting gain media 28 overlap a pumped region.

Figure 2:
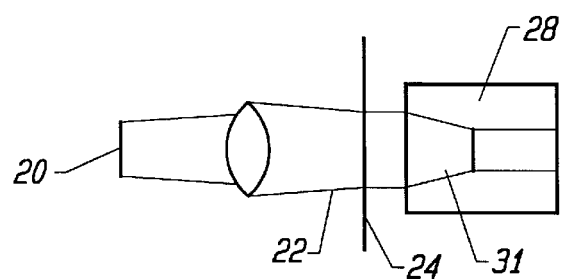
FIG. 2 is a schematic diagram of a laser gain media illustrating the pumped region of the laser media.

FIG. 2 illustrates pumped region 31 within gain media 28. Pumped region 31 is the area in gain media 28 where the pump light is substantially absorbed. In one embodiment, the absorption is 67% or more.

Figure 3:
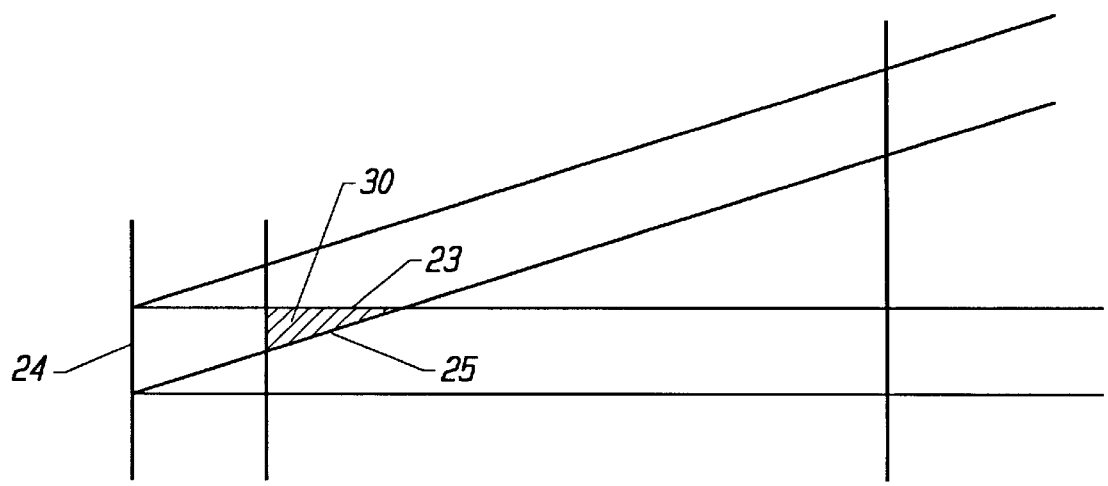
FIG. 3 is a schematic diagram of a laser gain media where there is insufficient overlap between the intracavity beams entering and exiting the gain media and the pumped region.
Figure 4:
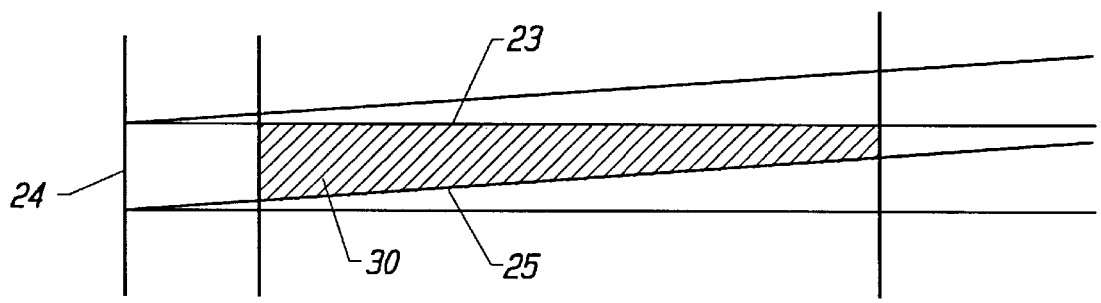
FIG. 4 is a schematic diagram of a laser gain media where there is sufficient overlap between the intracavity beams entering and exiting the gain media and the pumped region.

FIG. 3 illustrates that beams 23 and 25 do not substantially overlap pumped region 31. In FIG. 4 there is sufficient overlap.

Overlap region 30 between the entering and exiting intracavity beams 23 and 25 and pumped region 31 is at least 25%, and more preferably 50% or greater. A plurality of fold mirrors 24 can be included in laser cavity 16. Gain media 28 can be positioned adjacent to any one of the fold mirrors 24. Preferably, gain media 28 is positioned 5 mm or less from its associated fold mirror 24.

In one embodiment pump source 20 is a diode source including but not limited to a single emitter, a broad stripe emitter or preferably a fiber coupled diode bar. Diode bars combine a number of laser diodes, typically ten to twenty, on a single monolithic piece of semiconductor material. For a given pump power level diode bars are much simpler to manufacture than large numbers of discrete devices. Diode source 20 can be associated with one or more lenses 36 in order to focus output beam 22 from diode source 20 so that it is incident on gain media 28. In one embodiment, two lenses are provided in a telescope arrangement that optimize the size of the output beam.

Mode locking apparatus 26 can be any suitable mode-locking apparatus including but not limited to a semiconductor saturable absorber, or a multiple quantum well device. In one embodiment, an acousto-optic modulator can be placed adjacent to high reflector 14 or output coupler 12. When mode locking apparatus 26 is a multiple quantum well device it is preferably in intimate contact with output coupler 14. In this case a curved mirror or lens is typically used to focus the intracavity beam 25 to a small spot on multiple quantum well device 26.

A variety of different compositions can be used as gain media 28. These include but are not limited to Nd:YAG, Nd:YLF, Nd:YVO$_4$ and Nd:glass.

Figure 5:
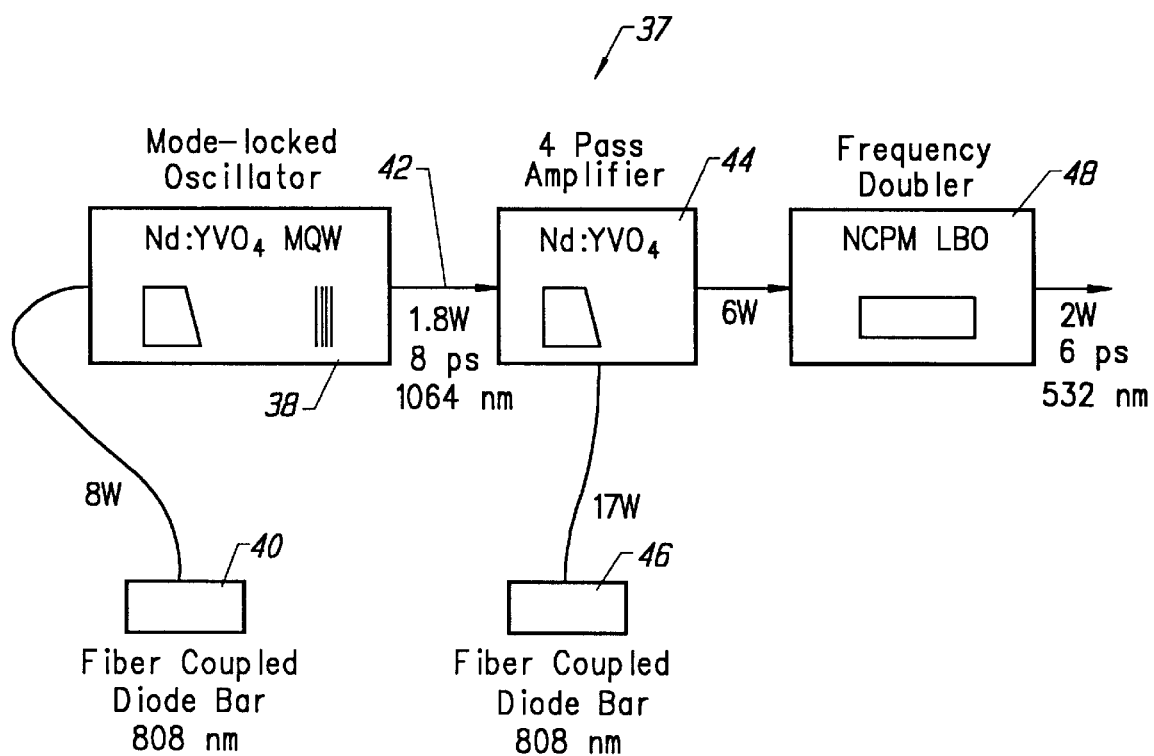
FIG. 5 is a schematic diagram of an oscillator-amplifier system of the present invention.

Referring now to FIG. 5, an oscillator-amplifier system 36 includes a mode-locked oscillator 38 and a pump source 40 coupled to mode-locked oscillator 38. An output beam 42 is produced by mode-locked oscillator 38 which is received by a solid state amplifier 44. To obtain high gain from solid state amplifier 44, the pumped region must be small, typically less than 1 mm in diameter. Unlike dye and excimer amplifiers, the pump and input beams must be focussed into the amplifier. Another pump source 46 is coupled to amplifier 44. A frequency doubler 48 can be optionally included.

Mode-locked oscillator 38 can be similar to the oscillator illustrated in FIG. 1, although it will be appreciated that other oscillators, including but not limited to cw sources, single frequency sources, or Q-switched oscillators, can also be used. Pump sources 40 and 46 can be diode pump sources including but not limited to single emitters, broad stripe emitters, or preferably fiber coupled diode bars and the like. Telescoping arrangements using different combinations of lenses can also be used both to reshape the pump beams 22 and the output beam 42.

Figure 6:
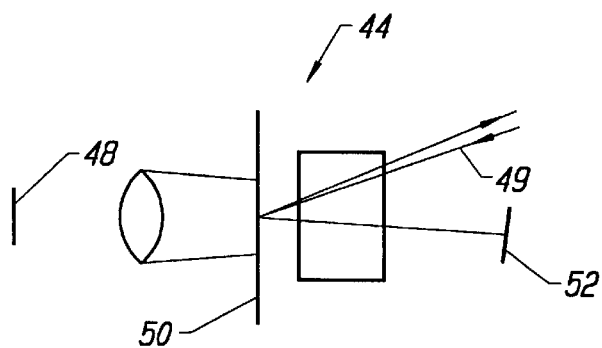
FIG. 6 is a schematic diagram of an amplifier with four passes of the input beam through the pumped region within one Rayleigh range.

Output beam 42 from oscillator 38 can become the input beam 49 to amplifier 44. As shown in FIG. 6, input beam 49 is reflected off of mirror 50 in amplifier 44 and goes back out in the same region. The beam then strikes mirror 52 and completely retraces its path. Second mirror 52 can be tilted slightly so by the time the beam has gone through amplifier 44 for its third and forth passes, it is slightly displaced. Input beam 49 can be cw, a mode-locked pulse train or Q-switched pulses.

In amplifier 44 input beam 49 makes more than two passes through the pumped region within one Rayleigh range of the beam. The Rayleigh range ($Z_R$) is defined as:

$$Z_R = \frac{\pi w_0^2}{\lambda}$$

where $w_0$=waist radius size and $\lambda$=wavelength. The Raleigh range is the distance a gaussian beam can propagate from its waist and only expand by a factor of $\sqrt{2}$ in radius.

In one embodiment of oscillator-amplifier system 36 (FIG. 5), pump source 40 is a fiber coupled diode bar with an output of 8 W at 808 nm. Further, pump source 40 can consist of 24 emitters which are collimated and coupled into a multimode fiber bundle. Nd:YVO$_4$, which emits at 1064 nm, is the gain media. Nd:YVO$_4$ has a short upper state lifetime and is less likely to Q-switch during mode-locked operation. In addition, the small signal gain in Nd:YVO$_4$ is large and thus makes an excellent amplifier. The mode-locking element of oscillator 38 can be an anti-resonant Fabry-Perot saturable absorber. In order to produce a higher power source amplifier 44 is used. A second fiber coupled diode bar 46 produced 17 W of pump power. Amplifier 44 was a four-pass amplifier which used Nd:YVO$_4$.

Mode-locked Nd:YVO$_4$ oscillator 38 is a high power source of picosecond pulses. Using amplifier 44 and increasing the pump power to 25 W, as much as 7.2 W of power at 1064 nm was generated. As much as 5 W of power was generated at 532 nm after frequency doubling in a 25 mm long non-critically phase matched LBO crystal. By mixing the pulses at 1064 nm and 532 nm 0.9 W has been obtained at 355 nm using a 12 mm long type-I LBO crystal. By frequency doubling the 532 pulses 1.1 W at 266 nm using a 7 mm long type-I BBO crystal was obtained.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A laser system, comprising:
   a high reflector and an output coupler defining a laser cavity with an optical axis;
   a pump source;
   a mode-locking apparatus;
   at least one fold mirror positioned in the laser cavity along the optical axis; and
   a gain media positioned adjacent to the fold mirror with a pumped region, wherein the gain media has an overlap region where an intracavity beam entering the gain media and an intracavity beam exiting the gain media substantially overlap the pumped region of the gain medium where the pumped beam is absorbed.

2. The laser system of claim 1, wherein the mode-locking apparatus is positioned adjacent to the high reflector or output coupler.

3. The laser system of claim 1, wherein the intracavity beam entering the gain media overlaps the intracavity beam exiting the gain media in an amount of 25% or greater.

4. The laser system of claim 1, wherein the intracavity beam entering the gain media overlaps the intracavity beam exiting the gain media in an amount of 50% or greater.

5. The laser system of claim 1, further comprising:
   a plurality of fold mirrors positioned along the optical axis of the laser cavity.

6. The laser system of claim 5, further comprising a plurality of gain media each positioned adjacent to a fold mirror.

7. The laser system of claim 1, wherein the gain media is positioned in the laser cavity along the optical axis a distance of 5 mm or less from the fold mirror.

8. The laser system of claim 1, wherein the pump source is a diode source.

9. The laser system of claim 8, wherein the diode source is a single emitter.

10. The laser system of claim 8, wherein the diode source is a broad stripe emitter.

11. The laser system of claim 8, wherein the diode source is a fiber coupled diode bar.

12. The laser system of claim 1, wherein the laser cavity is a linear laser cavity.

13. The laser system of claim 1, wherein the laser cavity produces a single output beam.

14. The laser system of claim 1, wherein the laser cavity is a ring cavity.

15. The laser system of claim 14, wherein the laser cavity produces a single output beam.

16. The laser system of claim 1, wherein the mode locking apparatus is a multiple quantum well device.

17. The laser system of claim 1, wherein the mode locking apparatus functions as a saturable absorber.

18. The laser system of claim 1, wherein the gain media is Nd:YAG.

19. The laser system of claim 1, wherein the gain media is Nd:YLF.

20. The laser system of claim 1, wherein the gain media is $Nd:YVO_4$.

21. The laser system of claim 1, wherein the gain media is Nd:glass.

22. The laser system of claim 1, wherein the laser cavity produces a single output beam of less than 25 picosecond pulses.

23. The laser system of claim 1, wherein the single output beam has a power of at least 0.5 watts.

24. An amplifier, comprising:
   a solid state gain media;
   a pump source;
   at least one mirror positioned near the gain media, wherein an input beam makes more than two passes in a single pumped region of the amplifier and within one Rayleigh range.

25. The amplifier of claim 24, wherein the input beam makes four passes in the amplifier within one Rayleigh range.

26. The amplifier of claim 24, wherein the gain media is $Nd:YVO_4$.

27. The amplifier of claim 24, wherein the gain media is Nd:YAG.

28. The amplifier of claim 24, wherein the gain media is Nd:YLF.

29. The amplifier of claim 24, wherein the gain media is Nd:glass.

30. The amplifier of claim 24, wherein the pump source is a diode source.

31. The amplifier of claim 30, wherein the diode source is a single emitter.

32. The amplifier of claim 30, wherein the diode source is a broad stripe emitter.

33. The amplifier of claim 30, wherein the diode source is a fiber coupled diode bar.

* * * * *